Nov. 19, 1929.   I. SHULMAN ET AL   1,736,552

EDUCATIONAL GAME

Filed April 14, 1928

Inventor
ISADOR SHULMAN
MYER SHULMAN
By Leon Edelson
Attorney.

Patented Nov. 19, 1929

1,736,552

UNITED STATES PATENT OFFICE

ISADOR SHULMAN AND MEYER SHULMAN, OF NEW YORK, N. Y.

EDUCATIONAL GAME

Application filed April 14, 1928. Serial No. 269,907.

This invention relates to educational devices and more particularly to a device for determining the proper but not readily ascertainable answer to a propounded question, the device being useful in the teaching or imparting of knowledge to children in particular at the same time that it provides an entertaining, amusing and instructive game that all may enjoy.

One of the primary objects of this invention is the provision of a card or the like upon which has been printed a particular question and its answer, the latter, however, being printed upon the card in such manner that it is not readily ascertainable. This effect is obtained by printing the question upon a portion of the card in the usual manner while the answer is printed upon another portion of the card in the form of an inverted image of the correctly printed answer so that when the card is placed in front of a mirror the optical counterpart of the inversely printed answer may be seen in the mirror in a form which is easily read. It will, of course, be understood that this card is only one of a set and that it is within the contemplation of this invention to provide a number of different sets of cards bearing upon different subjects.

A further object of the invention is the provision of a device including a mirror or mirrored surface and a base extending forwardly from the bottom edge of the mirror upon which the card may be placed, the device being operative to render the normally inversely printed answer on the card readable in the mirror.

A still further object of the invention is the provision of a collapsible reflecting device which may be closed into compact form and which when opened for use is capable of producing an image in the reflecting surface thereof which is the reverse of that which is placed in front of said surface.

A still further object of the invention is the provision of a device the use of which is instructive and entertaining and which is simple and inexpensive to manufacture.

Other objects will appear more fully hereinafter.

The invention consists substantially in the construction, combination, location, and relative arrangement of parts, all as will appear more fully hereinafter, as shown in the accompanying drawings and finally pointed out in the appended claims. While in the drawings I have chosen to illustrate the invention by use of a particular card bearing a certain question and its answer, it will be understood that the card may have printed thereon any other question and its answer or any other subject matter the printed text of which is in the form of an inverted image of the text as correctly printed; and it will be further understood that the relative positions of the question and its reversely printed answer upon the card may be varied as desired without departing from the principles or spirit of the invention as defined in the appended claims.

Figure 1:
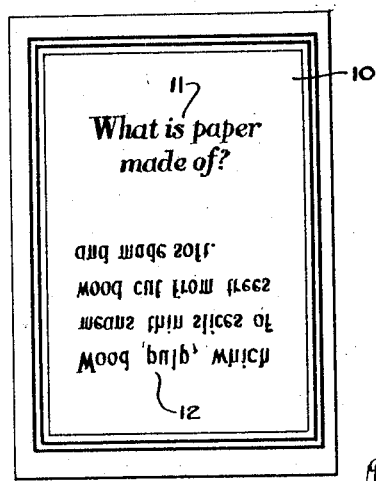
Figure 1 is a face view of a card having printed thereon a question and its answer, the latter being inversely printed.

Referring now to the drawings and more particularly to Figure 1 thereof, it will be seen that we have shown one card 10 of a set or series, of which there may be any desired number, each of said cards being provided with a printed question 11 and an answer 12 therefor, the latter being printed upon the card in the form of an inverted image of the correctly printed answer. Preferably, the question 11 is printed in the upper portion of the card while its inversely printed answer 12 is printed in the lower portion thereof. Furthermore, it is believed preferable to print the question and its answer upon the card in such manner that upon looking at the face thereof (see Figure 1) the answer is not only inversely printed with respect to the question but is also upside down, this for purposes which will be more apparent hereinafter. It will be understood, of course, that if desired the question and its reversely printed answer may be printed upon opposite faces of the card or upon portions thereof other than as shown in the drawings without departing from the principles or spirit of the invention.

Figure 4:
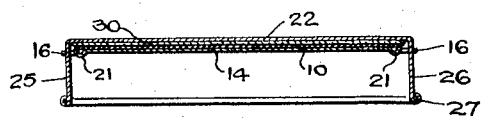
Figure 4 is a longitudinal cross section through the reflecting device when the latter is in closed and inoperative position.

It will be seen that upon looking at the card shown in Figure 1 the answer 12 to the propounded question 11 is not readily ascertainable or determined and recourse must therefore be had to a reflecting device which renders said answer easily readable. This device is designated generally by the reference numeral 13 and, as shown more particularly in Figures 2, 4 and 5, comprises a base or table 14, to one end of which is hingedly secured a substantially hood-shaped member 15. This base or table 14 is preferably flat from end to end, the rear edge thereof being provided with a pair of oppositely extending integrally formed projections 16, while the front edge thereof is provided with a depending flange 17 terminating in a forwardly extending portion 18, the free edge of said latter portion being beaded, as at 19, to form conjointly with the flange 17 an upwardly presenting channel 20 extending transversely across the front edge of the table 14. If desired, the said base or table 14 may be strengthened by the provision of reinforcing ribs 21 extending longitudinally from front to rear of the table adjacent either side thereof.

Figure 5:
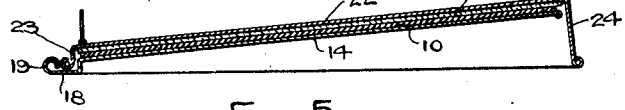
Figure 5 is a corresponding transverse cross-section through the device.
Figure 2:
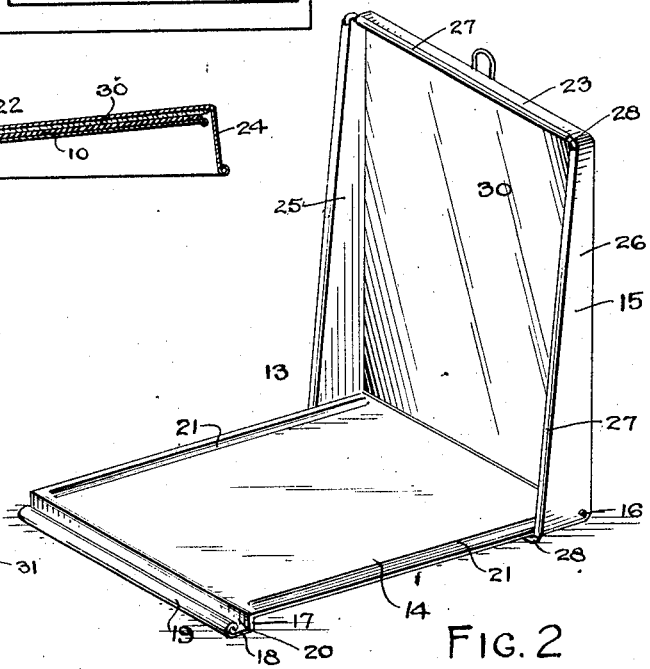
Figure 2 is a perspective view showing the reflecting device adapted for use in reading the inversely printed text of the card.

The hood-shaped member 15 comprises a main body 22, the side edges of which are inturned to constitute the walls 23, 24, 25 and 26, respectively. It will be seen that the wall 23 (which constitutes the top wall when the reflecting device is in operative position as shown in Figure 2) is of a depth substantially less than that of the opposite and bottom wall 24 and that the side walls 25 and 26, which latter extend between said top and bottom walls, gradually increase in depth from a depth at one end equal to that of the wall 23 to a depth at the opposite end equal to that of the wall 24. The free edges of the walls 23, 24, 25 and 26 are beaded as at 27 and, if desired, a reinforcing wire frame 28 may be provided in said beaded edge in order to increase the overall rigidity and strength of the member 15. Provided in opposite lower corners of the side walls 25 and 26 of the hood member 15 immediately adjacent the main body 22 thereof are a pair of openings 29 through which the oppositely extending projections 16 of the table 14 respectively project, the assembled arrangement between the table and hood members being such that when said members are folded together, as shown in Figure 5, the beaded edge of the top wall 23 of the hood member is frictionally received within the upwardly presenting channel 20 formed at the front edge of the table 14.

Figure 3:
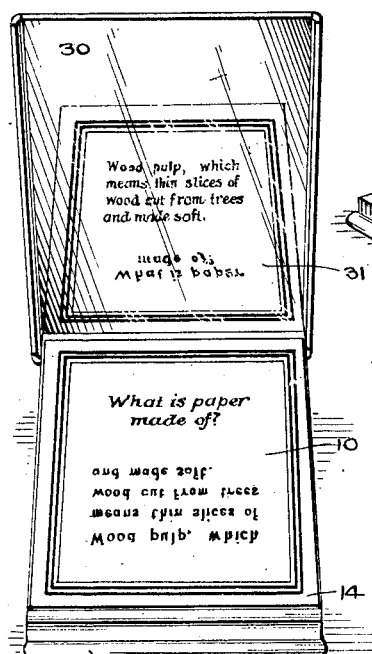
Figure 3 is a front view showing the card in place upon the reflecting device so that the optical counterpart thereof appears in the mirrored surface of the device.

As appears most clearly in Figures 2 and 3, the inner surface of the hood member 15 is mirrored, as at 30, by the provision of a separate mirror suitably secured in position against the main body 22 or by polishing or otherwise treating the latter to provide a suitable reflecting surface. Figure 3 clearly illustrates the mode of using this invention. A card such as that shown in Figure 1 is placed upon the base or table 14 of the reflecting device with the question end thereof adjacent the bottom edge of the substantially vertically extending mirror 30. A reflected image 31 of the card 10 is thus obtained in the mirror and by reason of the fact that the answer to the propounded question has been inversely printed upon the card the reflected image thereof in the mirror will be as though the answer on the card were correctly printed and hence the answer is easily readable in the mirror.

As has already been stated, it is deemed preferable to not only print both the question and its reversely printed answer upon the same face of the card but also to print them such that the answer is printed upside down with respect to the printed question, this because of the fact that the card when so printed can be placed upon the table 14 with the question in normal reading position while its answer appears in like position in the mirror. Of course, the question and answer could be printed upon opposite faces of the card without departing from the spirit of the invention but this would render it impossible to read both question and answer at the same time and for this reason is not considered to be as desirable an arrangement as that shown herein.

It is, of course, understood that various changes may be made from time to time without departing from the principles herein disclosed and accordingly it is intended to claim the invention broadly as well as specifically as indicated in the appended claims.

What is claimed as new and useful is:

1. In an educational device, a card having printed upon one face thereof a question and upon the same face thereof the answer to said question, said answer being printed inversely with respect to the printing of said question, the relative positionment of said question and answer being such that when the card is placed before a mirror the question may be read directly from the card and the answer from the mirror.

2. As an article of manufacture, a card having printed upon one portion thereof a certain question, the letters forming said question being arranged in the usual manner, said card having also printed upon another portion thereof the answer to said question, the letters forming said answer being arranged reversely as respects the usual manner, and said question and answer being so arranged upon the card that when the latter is placed before a mirror the question may be read directly from the card and the answer simultaneously from the mirror.

3. As an article of manufacture, a card having a question printed upon one portion thereof and an answer to said question printed upon another portion thereof, the letters forming said answer being reversely arranged with respect to the correctly printed answer, the said question and answer being so relatively arranged upon the card that when the same is placed before a mirror the question may be read directly from the card and the answer simultaneously from the mirror.

4. In an educational device, in combination, a card having a question printed upon the face thereof and an answer to said question printed upon the same face thereof, said answer being printed inversely with respect to the printing of said question whereby the content thereof is not readily ascertainable, and means, including a mirror, operative to produce a reflected image of said inversely printed answer whereby to render the latter readable in said mirror and the question simultaneously readable directly from said card.

5. In an educational device, in combination, a card having a certain question printed upon one portion thereof, the letters forming said question being arranged in the usual manner, said card having also printed thereon an answer to said question, the letters forming said answer being arranged reversely as respects the usual manner, and a reflecting device operative when said card is positioned thereon to produce a reflected image of said reversely printed answer wherein the latter appears in correct and normal reading position, said reflected image of the answer being readable in said device and the question simultaneously readable directly from said card.

6. In an educational device, in combination, a card having printed upon the same face thereof a question and its answer, the latter being printed in inverse manner and upside down with respect to the former, and a reflecting device including a flat table and an upstanding mirror adjacent one edge thereof, said table being arranged to receive thereon said card and said mirror being arranged to reflect therein said answer in such manner that the latter appears in correct and normal reading position at the same time that said question may be read directly from the card.

7. In an educational device, in combination, a normally horizontally arranged table, a mirrored member hingedly secured thereto, said mirrored member being arranged to fold over upon and assume a superimposed relation with respect to said table, means for maintaining said member in an upstanding position which is substantially normal to that of said table, and a card arranged to be placed upon said table when said member is in upstanding position so that the image thereof is obtainable in said member, said card being provided with an inversely printed text which is easily readable in said mirrored member.

8. In an educational device, in combination, a normally horizontally arranged table, a member having a reflecting surface secured to one edge of said table with said reflecting surface thereof facing toward said table, means for maintaining said member in upright position with respect to said table, and a card arranged to be placed upon said table so that the image thereof is obtainable in said reflecting surface, said card having a question printed upon one face thereof and the answer to said question inversely printed upon the same face thereof, said answer being further printed upside down with respect to the question, whereby when the card is placed upon the table the question may be read upon said card and the answer thereto simultaneously in said reflecting surface.

In testimony whereof, we have hereunto affixed our signatures.

ISADOR SHULMAN.
MEYER SHULMAN.